(12) United States Patent
Vaccaro (10) Patent No.: US 10,404,048 B2
(45) Date of Patent: Sep. 3, 2019

(54) ADAPTER FOR SEALING COVER FOR ELECTRICAL INTERCONNECTIONS

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

(*) Notice: Subject to any disclaimer, the term of this patent is extended or adjusted under 35 U.S.C. 154(b) by 314 days.

(21) Appl. No.: 14/539,335

(22) Filed: Nov. 12, 2014

(65) Prior Publication Data
US 2015/0144398 A1   May 28, 2015

Related U.S. Application Data

(60) Provisional application No. 61/908,977, filed on Nov. 26, 2013.

(51) Int. Cl.
| | |
|---|---|
| *H02G 15/013* | (2006.01) |
| *H01R 13/512* | (2006.01) |
| *H01R 13/52* | (2006.01) |
| *H01R 31/06* | (2006.01) |
| *B29L 31/34* | (2006.01) |
| *H01R 4/70* | (2006.01) |
| *H01R 13/622* | (2006.01) |

(52) U.S. Cl.
CPC .............. *H02G 15/013* (2013.01); *H01R 4/70* (2013.01); *H01R 13/512* (2013.01); *H01R 13/5213* (2013.01); *H01R 13/622* (2013.01); *H01R 31/06* (2013.01); *B29L 2031/3456* (2013.01); *H01R 2201/02* (2013.01)

(58) Field of Classification Search
CPC .... H02G 15/013; H01R 13/46–13/533; H01R 31/06–31/065; B29L 2031/3456
USPC ...................................................... 174/153 G
See application file for complete search history.

(56) References Cited

U.S. PATENT DOCUMENTS

| | | | | |
|---|---|---|---|---|
| 3,079,102 A | * | 2/1963 | Douglas | B65H 75/242 242/573 |
| 3,352,563 A | * | 11/1967 | Flair | B63C 11/44 277/583 |
| 3,423,518 A | * | 1/1969 | Weagant | H02G 3/0675 174/153 G |
| 3,739,321 A | * | 6/1973 | Murphy | H01R 13/5205 439/589 |

(Continued)

OTHER PUBLICATIONS

International Search Report and Written Opinion for corresponding PCT Application No. PCT/US2014/065398, dated Feb. 27, 2015, 13 pages.

(Continued)

*Primary Examiner* — Dimary S. Lopez Cruz
*Assistant Examiner* — Muhammed Azam
(74) *Attorney, Agent, or Firm* — Myers Bigel, P.A.

(57) ABSTRACT

An assembly includes: a mounting structure having a threaded member; a generally annular adapter, the adapter having threads that engage the threaded member, the adapter further including a radially outward sealing surface formed of one of the materials; an electrical cable having a connector threaded onto the threaded member, and a sealing boot that covers the connector and engages the sealing surface of the adapter.

11 Claims, 6 Drawing Sheets

(56) References Cited

U.S. PATENT DOCUMENTS

| | | | | |
|---|---|---|---|---|
| 3,750,084 A * | 7/1973 | Gardner | H01R 13/53 | 439/253 |
| 3,761,601 A * | 9/1973 | Kaesser | H01B 17/306 | 174/151 |
| 3,781,765 A * | 12/1973 | Schleicher | H01R 13/502 | 439/472 |
| 3,829,600 A * | 8/1974 | Portinari | H02G 15/184 | 174/73.1 |
| 4,059,330 A * | 11/1977 | Shirey | H01R 9/0518 | 29/828 |
| 4,126,170 A * | 11/1978 | DeHaitre | F16B 33/004 | 411/303 |
| 4,156,554 A * | 5/1979 | Aujla | H01R 9/05 | 174/89 |
| 4,173,385 A * | 11/1979 | Fenn | H01R 9/05 | 439/277 |
| 4,220,385 A * | 9/1980 | Luca, Jr. | H01R 13/5205 | 439/445 |
| 4,232,712 A * | 11/1980 | Squires | B29C 61/04 | 138/109 |
| 4,238,974 A * | 12/1980 | Fawcett | F16C 1/265 | 403/122 |
| 4,273,408 A * | 6/1981 | Orr | H01R 9/2491 | 439/709 |
| 4,305,638 A * | 12/1981 | Hutter | H01R 9/0521 | 439/583 |
| 4,312,563 A * | 1/1982 | Mead | G02B 6/4428 | 385/76 |
| 4,335,932 A * | 6/1982 | Herrmann, Jr. | B29C 33/0016 | 174/541 |
| 4,346,811 A * | 8/1982 | Hilaire | B29C 45/4407 | 215/252 |
| 4,367,797 A * | 1/1983 | Brown | H01R 13/523 | 166/380 |
| 4,368,940 A * | 1/1983 | Sugiura | H01R 24/52 | 439/170 |
| 4,447,104 A * | 5/1984 | Haggard | H01R 13/523 | 439/275 |
| 4,531,796 A * | 7/1985 | Gansert | H01R 13/5221 | 439/271 |
| 4,549,037 A * | 10/1985 | Bawa | H02G 3/088 | 174/667 |
| 4,614,398 A * | 9/1986 | Wright | H01R 13/6592 | 439/579 |
| 4,621,937 A * | 11/1986 | Maccuaig | B60T 11/04 | 285/192 |
| 4,666,228 A * | 5/1987 | Wood | H01R 13/746 | 29/876 |
| 4,676,573 A * | 6/1987 | Norman | H01R 13/625 | 439/318 |
| 4,697,870 A * | 10/1987 | Richards | G02B 6/3813 | 385/125 |
| 4,758,174 A * | 7/1988 | Michaels | H01R 13/5219 | 439/281 |
| 4,778,402 A * | 10/1988 | Schoepf | E21B 47/011 | 439/194 |
| 4,790,306 A * | 12/1988 | Braun | A62B 18/025 | 128/206.12 |
| 4,795,354 A * | 1/1989 | Owen | H01R 12/87 | 439/135 |
| 4,797,117 A * | 1/1989 | Ayers | H01R 13/523 | 439/200 |
| 4,806,301 A * | 2/1989 | Conti | B29C 33/42 | 264/318 |
| 4,810,832 A * | 3/1989 | Spinner | H01R 13/5205 | 174/654 |
| 4,871,328 A * | 10/1989 | Wright | H01R 13/5202 | 439/589 |
| 4,895,529 A * | 1/1990 | Thakrar | B29C 45/1635 | 439/281 |
| 4,901,956 A * | 2/1990 | Jacobsen | H02G 15/013 | 174/481 |
| 5,017,160 A * | 5/1991 | Garcia | E21B 17/028 | 439/271 |
| 5,049,896 A * | 9/1991 | Conley | H01Q 1/1228 | 343/709 |
| 5,152,499 A * | 10/1992 | Silverman | F16L 19/0231 | 251/148 |
| 5,154,636 A * | 10/1992 | Vaccaro | H01R 24/564 | 439/578 |
| 5,387,119 A * | 2/1995 | Wood | H01R 13/523 | 439/281 |
| 5,391,088 A * | 2/1995 | Tomchak | H01R 13/621 | 439/216 |
| 5,458,507 A * | 10/1995 | Colescott | E21B 17/028 | 439/589 |
| 5,470,248 A * | 11/1995 | Wood | H01R 13/523 | 439/271 |
| 5,618,204 A * | 4/1997 | Nix | H01R 13/5202 | 439/271 |
| 5,704,799 A * | 1/1998 | Wood | H01R 13/523 | 439/271 |
| 5,711,685 A * | 1/1998 | Wood | H01R 13/5221 | 439/587 |
| 5,772,457 A * | 6/1998 | Cairns | H01R 13/523 | 439/201 |
| 5,795,554 A * | 8/1998 | Fang | B01J 21/10 | 423/21.1 |
| 5,890,913 A * | 4/1999 | Kyllonen | H01R 24/52 | 439/578 |
| 5,938,474 A * | 8/1999 | Nelson | H01R 9/0521 | 439/578 |
| 5,980,317 A * | 11/1999 | McNeel | H01R 13/502 | 439/281 |
| 6,179,656 B1 * | 1/2001 | Wong | H01R 9/0518 | 439/578 |
| 6,190,481 B1 * | 2/2001 | Iida | B29C 70/382 | 156/153 |
| 6,217,384 B1 * | 4/2001 | Strasser | H01R 24/564 | 439/578 |
| 6,241,553 B1 * | 6/2001 | Hsia | H01R 9/0521 | 439/578 |
| 6,358,078 B1 * | 3/2002 | Crippa | H01R 13/5219 | 439/283 |
| 6,383,019 B1 * | 5/2002 | Wild | H01R 13/6273 | 439/357 |
| 6,409,179 B1 * | 6/2002 | Daoud | F16J 15/3228 | 277/551 |
| 6,443,457 B1 * | 9/2002 | Daoud | H02G 15/013 | 174/651 |
| 6,468,113 B1 | 10/2002 | Murakami et al. | | |
| 6,469,113 B1 * | 10/2002 | Lee | C07F 17/00 | 502/120 |
| 6,495,753 B1 * | 12/2002 | Goodsell | H02G 3/22 | 174/483 |
| 6,603,078 B2 * | 8/2003 | Okuhara | B60R 16/0222 | 16/2.1 |
| 6,682,358 B1 * | 1/2004 | Morris | H01R 13/523 | 439/135 |
| 6,730,849 B2 * | 5/2004 | Koessler | H02G 15/013 | 174/650 |
| 6,840,803 B2 * | 1/2005 | Wlos | H01R 9/0518 | 439/578 |
| 6,870,106 B1 * | 3/2005 | Schiffbauer | H02G 15/013 | 174/74 R |
| 6,893,290 B2 * | 5/2005 | Buenz | H01R 9/0521 | 439/578 |
| 7,074,081 B2 * | 7/2006 | Hsia | H01R 9/0521 | 439/578 |
| 7,097,499 B1 * | 8/2006 | Purdy | H01R 9/0521 | 439/578 |
| 7,112,093 B1 * | 9/2006 | Holland | H01R 9/0518 | 439/585 |
| 7,118,416 B2 * | 10/2006 | Montena | H01R 13/5205 | 439/584 |
| 7,329,149 B2 | 2/2008 | Montena | | |
| 7,335,059 B2 * | 2/2008 | Vaccaro | H01R 43/28 | 439/578 |

(56) References Cited

U.S. PATENT DOCUMENTS

| | | | | |
|---|---|---|---|---|
| 7,384,291 B2* | 6/2008 | Franks, Jr. | .......... | H01R 13/5205 439/271 |
| 7,767,908 B2* | 8/2010 | Sylvan | ....................... | F16L 5/10 174/72 A |
| 7,838,775 B2* | 11/2010 | Montena | ............ | H01R 13/5213 174/138 F |
| 8,136,234 B2* | 3/2012 | Islam | ....................... | H01R 9/05 29/747 |
| 8,419,467 B2* | 4/2013 | Montena | ............ | H01R 13/5213 439/523 |
| 8,628,352 B2* | 1/2014 | Nugent | .................... | H01R 9/05 439/578 |
| 9,172,154 B2* | 10/2015 | Burris | ....................... | H01R 9/05 |
| 9,216,530 B2* | 12/2015 | Vaccaro | ................ | B29C 45/261 |
| 9,608,361 B2* | 3/2017 | Vaccaro | ............ | H01R 13/5205 |
| 9,667,054 B2* | 5/2017 | Vaccaro | ............ | H02G 15/046 |
| 2001/0047877 A1* | 12/2001 | Miyazaki | ........... | H01R 13/6593 174/84 R |
| 2002/0002005 A1* | 1/2002 | Whybrow | ............ | H01R 13/516 439/625 |
| 2002/0033604 A1* | 3/2002 | Minemyer | .............. | F16L 17/04 285/373 |
| 2002/0151209 A1* | 10/2002 | Milanowski | ......... | G02B 6/3887 439/460 |
| 2003/0181073 A1* | 9/2003 | Nagano | ................. | H01R 13/41 439/63 |
| 2004/0045396 A1* | 3/2004 | Hosokawa | .......... | B29C 65/0618 74/552 |
| 2004/0207202 A1 | 10/2004 | Parks | | |
| 2005/0079760 A1* | 4/2005 | Vaccaro | ............... | H01R 9/0521 439/578 |
| 2005/0079761 A1* | 4/2005 | Rodrigues | ............ | H01R 9/0521 439/578 |
| 2005/0136735 A1* | 6/2005 | Rodrigues | ............ | H01R 9/0524 439/578 |
| 2005/0176296 A1* | 8/2005 | Montena | .................. | H01R 9/05 439/587 |
| 2005/0227526 A1* | 10/2005 | Hopper | .................... | G01K 1/14 439/302 |
| 2005/0265668 A1* | 12/2005 | Martin | ................. | G02B 6/3887 385/86 |
| 2006/0258181 A1* | 11/2006 | Holland | ............... | H01R 9/0518 439/63 |
| 2007/0037446 A1 | 2/2007 | Khemakhem et al. | | |
| 2008/0020644 A1* | 1/2008 | Haas | .................... | H01R 13/625 439/607.41 |
| 2008/0045081 A1* | 2/2008 | Studerus | ............ | H01R 13/5205 439/578 |
| 2009/0093159 A1* | 4/2009 | Aoki | ....................... | H01R 9/032 439/607.41 |
| 2009/0246997 A1* | 10/2009 | Moller | ................. | H01R 13/502 439/352 |
| 2010/0029114 A1* | 2/2010 | Hsu | .................... | H01R 13/5205 439/271 |
| 2010/0190375 A1 | 7/2010 | Rohde | | |
| 2010/0248533 A1* | 9/2010 | Montena | ............ | H01R 13/5213 439/521 |
| 2011/0059638 A1* | 3/2011 | Sandwith | ............. | H01R 13/521 439/271 |
| 2011/0111623 A1* | 5/2011 | Burris | ................. | H01R 9/0524 439/578 |
| 2011/0162881 A1* | 7/2011 | Schipporeit | .......... | H02G 15/013 174/70 R |
| 2011/0250789 A1 | 10/2011 | Burris et al. | | |
| 2011/0270363 A1* | 11/2011 | Schramm | ............. | A61N 1/3752 607/72 |
| 2011/0312199 A1* | 12/2011 | Alrutz | .................. | H01R 13/622 439/188 |
| 2012/0100738 A1 | 4/2012 | Palinkas et al. | | |
| 2012/0196476 A1* | 8/2012 | Haberek | ................... | H01R 9/05 439/578 |
| 2012/0214341 A1* | 8/2012 | Huang | ............... | H01R 13/5202 439/583 |
| 2012/0230797 A1* | 9/2012 | Wallbaum | ........... | H01R 13/512 411/103 |
| 2012/0238126 A1* | 9/2012 | Damodharan | ....... | H01R 4/2433 439/395 |
| 2012/0282879 A1* | 11/2012 | Smith | ..................... | H04W 4/22 455/404.1 |
| 2013/0065443 A1* | 3/2013 | Jullien | .................. | A61N 1/3752 439/620.03 |
| 2013/0149884 A1* | 6/2013 | Shaw | ..................... | H01R 13/46 439/275 |
| 2013/0299234 A1* | 11/2013 | Izawa | .................. | H02G 3/0406 174/70 R |
| 2014/0097022 A1 | 4/2014 | Vaccaro | | |
| 2014/0134873 A1* | 5/2014 | Lehmann | ............. | H01R 4/2495 439/421 |
| 2014/0242840 A1* | 8/2014 | Dang | ................. | H01R 13/6461 439/607.01 |
| 2017/0302019 A1* | 10/2017 | Horiuchi | ............ | H01R 13/5202 |
| 2017/0363817 A1* | 12/2017 | Kempeneers | ........ | G02B 6/4471 |

OTHER PUBLICATIONS

European Supplemental Search Report corresponding to European Patent Application No. 14866393.3, dated Apr. 6, 2017, 11 pages.

Office Action corresponding to Chinese Patent Application No. 201480062552.3, dated Dec. 18, 2017.

Examination Report corresponding additional non-patent literature to European Patent Application No. 14866393.3, dated Mar. 23, 2018.

* cited by examiner

ADAPTER FOR SEALING COVER FOR ELECTRICAL INTERCONNECTIONS

RELATED APPLICATION

The present application claims priority from and the benefit of U.S. Provisional Patent Application No. 61/908,977, filed Nov. 26, 2013, the disclosure of which is hereby incorporated herein by reference in its entirety.

FIELD OF THE INVENTION

The invention relates generally to a device for environmentally sealing and securing the interconnection between electrical cables.

BACKGROUND

Electrical interconnections, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. patent application Ser. No. 13/646,952, filed Oct. 8, 2012, and U.S. patent application Ser. No. 13/938,475, filed Jul. 10, 2013, the disclosures of each of which are hereby incorporated by reference herein.

SUMMARY

As a first aspect, embodiments of the invention are directed to a sealing adapter for enhancing sealing of a sealing device and a threaded member. The adapter comprises: a generally annular outer shell formed of a first material, the outer shell having first and second longitudinal ends and an inner surface, the inner surface including at least one thread; and a generally annular inner core formed of a second material that differs from the first material, the inner core including a threaded inner surface that combines with the at least one thread of the outer shell to form a threaded arrangement configured to be received on a threaded member.

As a second aspect, embodiments of the invention are directed to an assembly, comprising: a mounting structure having a threaded member; a generally annular adapter, the adapter having threads that engage the threaded member, the adapter further including a radially outward sealing surface formed of one of the materials; an electrical cable having a connector threaded onto the threaded member, and a sealing boot that covers the connector and engages the sealing surface of the adapter.

As a third aspect, embodiments of the invention are directed to a method of forming a sealing adapter, comprising the steps of: (a) injection molding a generally annular outer shell with a first material, the outer shell having first and second longitudinal ends and an inner surface, the inner surface including at least one thread; and (b) injection molding a generally annular inner core formed of a second material that differs from the first material, the inner core including a threaded inner surface that combines with the at least one thread of the outer shell to form a threaded arrangement configured to be received on a threaded member, the inner core further comprising an outer surface that presents a sealing location for the sealing device, wherein step (b) is carried out in a mold that contains the already-formed outer shell.

As a fourth aspect, embodiments of the inventions are directed to a sealing adapter for enhancing sealing of a sealing device and a threaded member, comprising: a generally annular outer ring; a generally annular inner ring that is concentric with the outer ring, wherein a generally annular gap is formed between the outer ring and the inner ring; and one or more threads extending radially inwardly from an inner surface of the inner ring.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, exemplary mounting structures for attachment of an electrical cable are shown in FIGS. 1-3B. The mounting structures 10 (in FIGS. 2-3B) and 10' (in FIGS. 1 and 1A) may be any mounting structure having an electrical connector with a threaded stem 12, 12' to which an electrical cable can be attached via a mating connector. As examples, the mounting structures 10, 10' may be an antenna, RRH, or the like.

Figure 1:
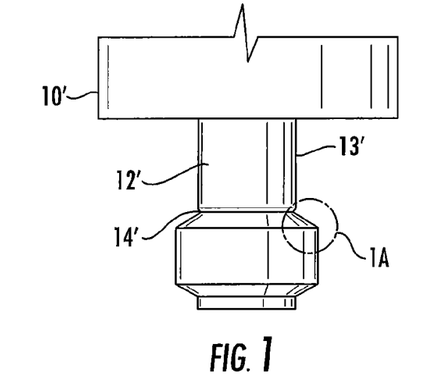
FIG. 1 is a top view of an antenna, remote radio head (RRH) or other mounting structure with a threaded stem for electrical connection.
Figure 1A:
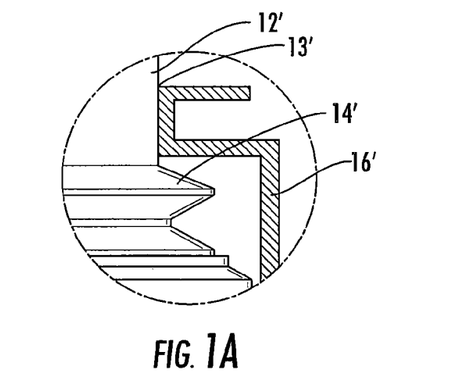
FIG. 1A is a top view of an enlarged section of the threaded stem of FIG. 1 with a sealing boot applied.
Figure 2:
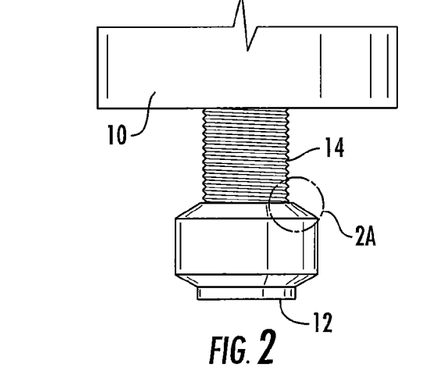
FIG. 2 is a top view of an alternative mounting structure with a threaded stem with threads along most or all of its length.
Figure 2A:
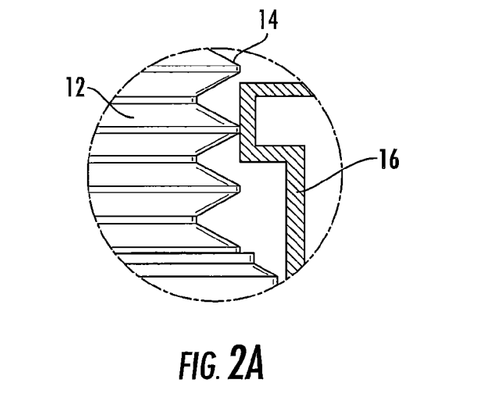
FIG. 2A is a top view of an enlarged section of the threaded stem of FIG. 2 with a sealing boot applied.

The mounting structure 10' includes a threaded stem 12' that has a smooth surface 13' adjacent the bulkhead of the mounting structure 10' and a threaded surface 14' on its free end (see FIG. 1A). The smooth surface 13' provides a surface appropriate for sealing with a sealing boot 16' or the like. In contrast, the mounting structure 10 of FIGS. 2 and 2A includes a threaded stem 12 that has a predominantly, if not entirely, threaded surface 14. As can be seen in FIG. 2A, the sealing boot 16 (which is typically formed of an elastomeric material such as rubber) contacts the threads of the threaded surface 14, which can create voids in the engagement between the sealing boot 16 and the stem 12 through which water and other environmental agents can seep.

Figure 3:
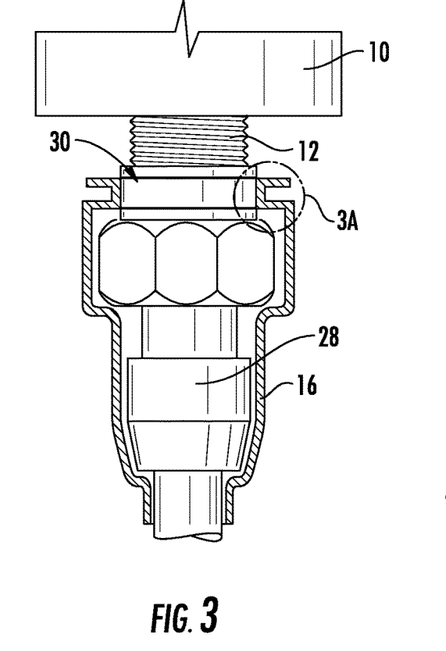
FIG. 3 is a top view of the mounting structure of FIG. 2 including a sealing adapter in accordance with embodiments of the present invention.
Figure 3A:
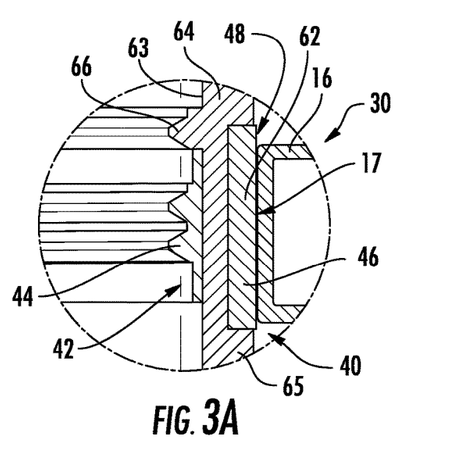
FIG. 3A is a top view of an enlarged section of the threaded stem and sealing adapter of FIG. 3 with a sealing boot applied and with a connecting nut in place on the threaded stem, with the sealing adapter and sealing boot shown in section view.
Figure 3B:
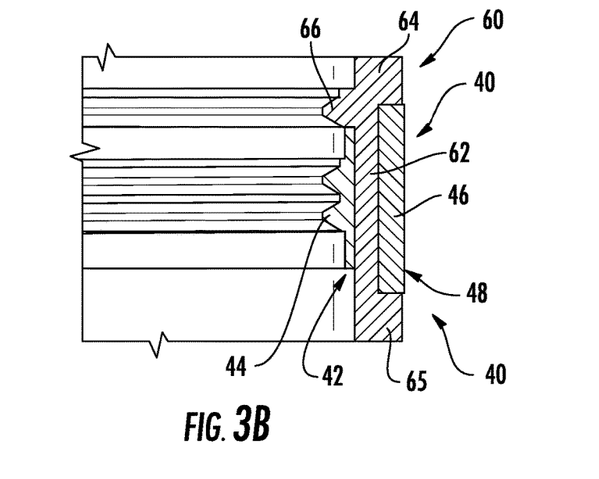
FIG. 3B is a further enlarged top/section view of the threaded stem, sealing adapter and sealing boot of FIG. 3A.
Figure 4:
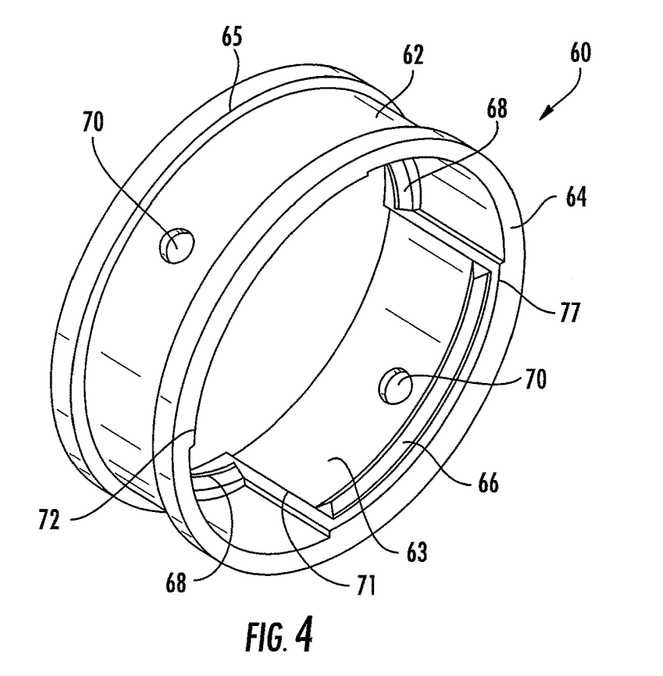
FIG. 4 is a perspective view of the outer core of the sealing adapter of FIG. 3.
Figure 5:
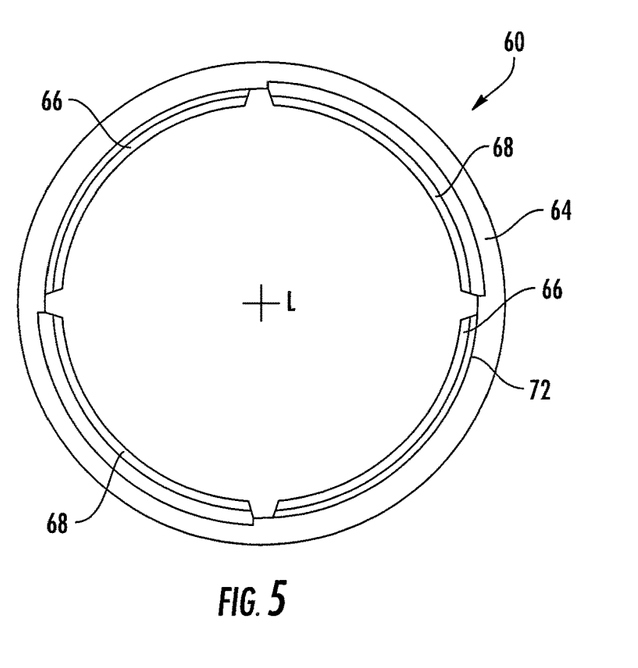
FIG. 5 is an enlarged top view of the outer core of the sealing adapter of FIG. 3.
Figure 6:
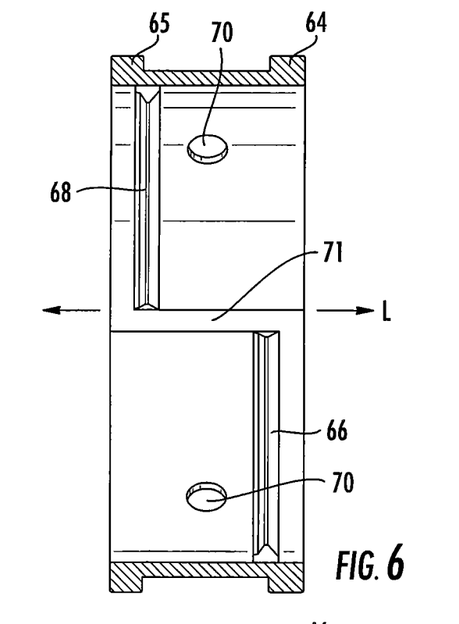
FIG. 6 is an enlarged section view of the outer core of the sealing adapter of FIG. 3.
Figure 7:
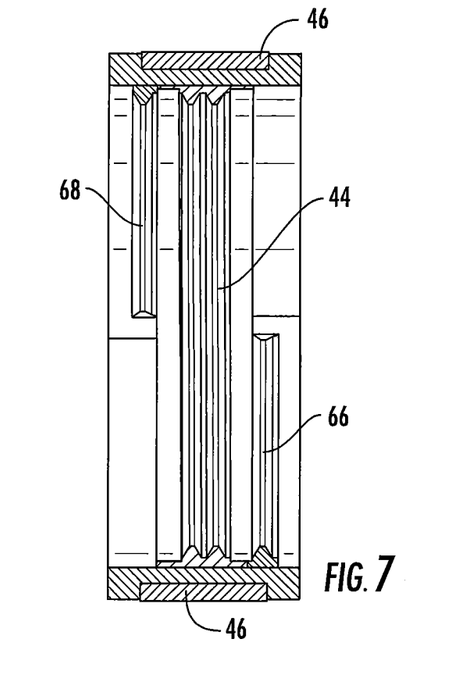
FIG. 7 is an enlarged section view of the outer shell and inner core of the sealing adapter of FIG. 1.

Referring now to FIGS. 3-7, a sealing adapter, designated broadly at 30, is illustrated therein. As can be seen in FIGS. 4 and 6, the sealing adapter 30 is generally annular and defines a longitudinal axis L. The sealing adapter 30 is a composite of a relatively soft inner core 40 with a relatively harder outer shell 60; these components are described in greater detail below.

The outer shell 60 has a generally annular body 62 with overhanging, radially outwardly-extending upper and lower rims 64, 65, with the result that, in cross-section, the profile of the outer shell 60 is generally C-shaped (see FIGS. 3A and 6). The inner surface 63 of the body 62 includes two upper quarter threads 66 adjacent one end of the outer shell 60 and two lower quarter threads 68 adjacent the other end of the outer shell 60. The upper quarter threads 66 are located opposite from each other across the body 62 (i.e., they are offset from each other by about 180 degrees), as are the two lower quarter threads 68, with the lower quarter threads 68 being offset from the upper quarter threads 66 by about 90 degrees (see FIGS. 4, 5 and 6). All of the quarter threads 66, 68 are canted relative to the longitudinal axis L of the body 62 (see one upper quarter thread 66 and one lower quarter thread 68 in FIG. 6) to enable the outer shell 60 to receive the threaded stem 12 of the mounting structure 10. Four ribs 71 connect the ends of adjacent quarter threads 66, 68 and merge with shoulders 72 that span the arc of each quarter thread 66, 68 flush with the adjacent rim 64, 65. Four holes 70 are formed circumferentially equidistant from each other in the body 62.

As described above, the outer shell 60 is formed of a material that is relatively harder than that of the inner core 40, and is typically one that exhibits good strength and rigidity. Exemplary materials for the outer shell include polypropylene and nylon.

The inner core 40 includes an inner ring 42 that has inwardly-extending threads 44 sized to mate with the threads 14 of the threaded stem 12. As can be seen in FIG. 3B, the inner ring 42 resides radially inwardly of the body 62 of the outer shell 60 and between the upper and lower quarter threads 66, 68. Together, the threads 44 and the upper and lower quarter threads 66, 68 of the outer shell 60 form a threaded arrangement configured to be received on the threaded stem 12 of the mounting structure 10. The inner core 40 also includes an outer ring 46 that resides between and is sandwiched by the upper and lower ledges 64, 65 of the outer shell 60. The outer ring 46 presents an outer sealing surface 48. The inner and outer rings 42, 46 are connected by segments that extend through the holes 70 in the outer shell 60.

As noted above, the inner core 40 is typically formed of a material that is relatively softer than that of the outer shell 60. Exemplary materials for the inner core 40 include rubber, silicone rubber and EPDM.

As can be seen in FIGS. 3A and 3B, the adapter 30 can be threaded onto the threads of the threaded surface 14 of the threaded stem 12 of the mounting structure 10. The quarter threads 66, 68 of the outer shell 60 provide a firm, strong, substantially rigid engagement with the threaded surface 14. In contrast, the resilience of the threads 44 of the inner core 40 provides a seal between the adapter 30 and the threaded surface 14. Thus, the adapter 30 can provide an interface with the threaded stem 12 that is both mechanically sound and sealed. It should also be noted that the approximately 180 degree spacing of the upper quarter threads 66 and similar spacing of the lower quarter threads 68 can provide stability to the adapter 30 as and after it is threaded into place.

As shown in FIG. 3A, a sealing boot 16 can then be applied over the adapter 30 such that a sealing surface 17 of the sealing boot 16 contacts and overlies the outer sealing surface 48 of the adapter to protect the connector 28; engagement between these two surfaces 17, 48 provides a seal between the adapter 30 and the sealing boot 16. Thus, there are no voids that might otherwise be created by the sealing boot 16 and the threaded surface 14 alone (see FIG. 3A).

Referring now to FIG. 6, it can be understood that the outer shell 60 of the adapter 30 can be formed by a relatively straightforward injection molding process due to the configuration of the quarter threads 66, 68. FIG. 6 shows one upper quarter thread 66 and one lower quarter thread 68, which are spaced from each other about the longitudinal axis L by about 90 degrees; as described above, the other upper quarter thread 66 is spaced and 180 degrees from the illustrated upper quarter thread 66, and the other lower quarter thread 68 is spaced about 180 degrees from the illustrated lower thread 68. Those skilled in this art will appreciate that the mold halves of an injection mold can form the quarter threads 66, 68 by simply separating along the longitudinal axis L of the outer shell 60; there is no need for any "side action" mechanism in the mold to form the quarter threads 66, 68, which could complicate the mold construction and molding process. The holes 70 can also be formed during the molding process by a side action in the mold perpendicular to the longitudinal axis L; alternatively, they may be drilled or otherwise formed later.

Once the outer shell 60 is formed, it can be placed in a second injection mold, wherein softer material is injected to form the inner core 40. The presence of the holes 70 enables the softer material to flow into the section of the mold that forms the inner ring 42. The material of the inner core 40 is sufficiently flexible that the threads 44 of the inner core 40 can deform to enable the adapter 30 to be removed from the mold.

Those skilled in this art will appreciate that other configurations of the adapter 30 may also be suitable. For example, the arrangement of the threads of the outer shell 60 may vary; two half threads or eight eighth threads may be employed rather than four quarter threads, threads may be provided only at one end of the outer shell 60, and/or the offsets of the threads may be varied or omitted. As another example, the upper and lower rims 64, 65 of the outer shell 60 may be omitted, such that the sealing surface 48 of the outer ring 46 of the inner core 40 extends the full length of the adapter 30. More or fewer holes 70 (e.g., two holes, six holes, eight holes, etc.) may be included, or they may take a different form (e.g., slots, slits, or other opening or aperture configurations). Other alternatives will be apparent to those of skill in this art.

Figure 8:
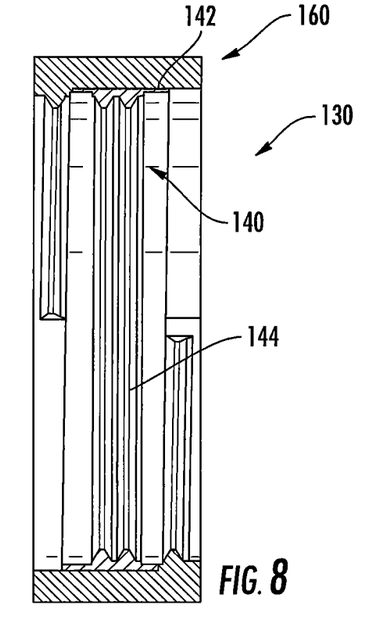
FIG. 8 is a section view of a sealing adapter according to alternative embodiments of the invention.

Referring now to FIG. 8, another adapter according to embodiments of the invention, designated broadly at 130, is shown therein. The adapter 130 is similar to the adapter 30 in that it includes an outer shell 160 and an inner core 140, but the inner core 140 has only an inner ring 142 (i.e., it has no outer ring); hence, the outer shell 160 requires no through holes. The inner ring 142, which includes teeth 144, is formed of softer material than the outer core 160.

The inner core 140 is attached to the outer shell 160 via a two-step injection molding process as described above; alternatively, the inner core 140 may be attached via adhesives or other fastening techniques. The adapter 130 may be more straightforward to injection mold than the adapter 30.

Figure 9:
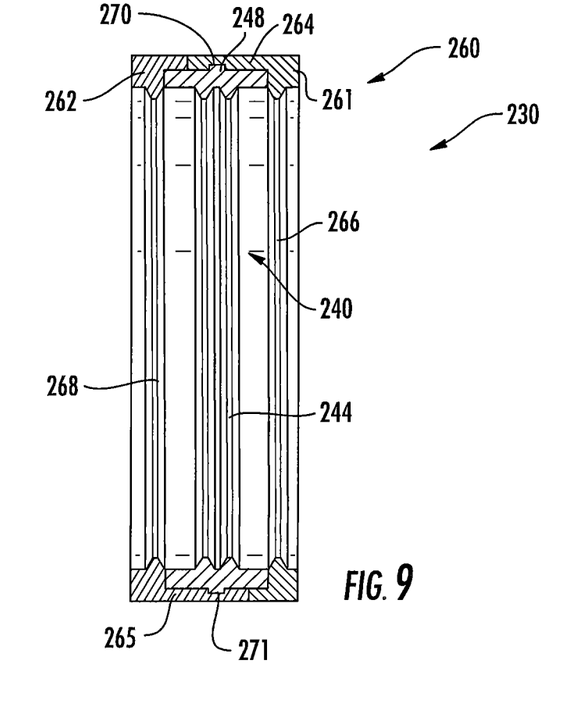
FIG. 9 is a section view of a sealing adapter according to further alternative embodiments of the invention.

FIG. 9 illustrates another embodiment of an adapter, designated broadly at 230. The adapter 230 includes an inner core 240 with teeth 244 that is similar to the inner core 140 described above. The adapter 230 also includes an outer shell 260 that is formed of two mating "clamshell" pieces 261, 262 of a harder material than that of the inner core 240. As seen in FIG. 9, each of the clamshell pieces 261, 262 (which in this embodiment are substantially identical) has a stepped profile with a raised semicircular wall 264, 265, which enables the pieces 261, 262 to mate with each other. A groove 270, 271 is located in each wall 264, 265 that receives a tab 248 that extends radially outwardly from the inner core 240. The interaction between the tab 248 and the grooves 270, 271 connects the clamshell pieces 261, 262 with the inner core 240.

Notably, each of the clamshell pieces 261, 262 includes a respective thread 266, 268 that extends for most of the circumference of the piece 261, 262. Formation of the outer core 260 in two pieces 261, 262 enables each of the threads 266, 268 to be formed in a straightforward manner in a reciprocating injection molding operation, thereby eliminating the benefit of the quarter threads discussed above in connection with the adapters 30, 130. The inner core 240 can be molded onto one of the clamshell pieces 261, 262 prior to assembly or molded separately and inserted between the clamshell pieces 261, 262 prior to assembly.

Figure 10:
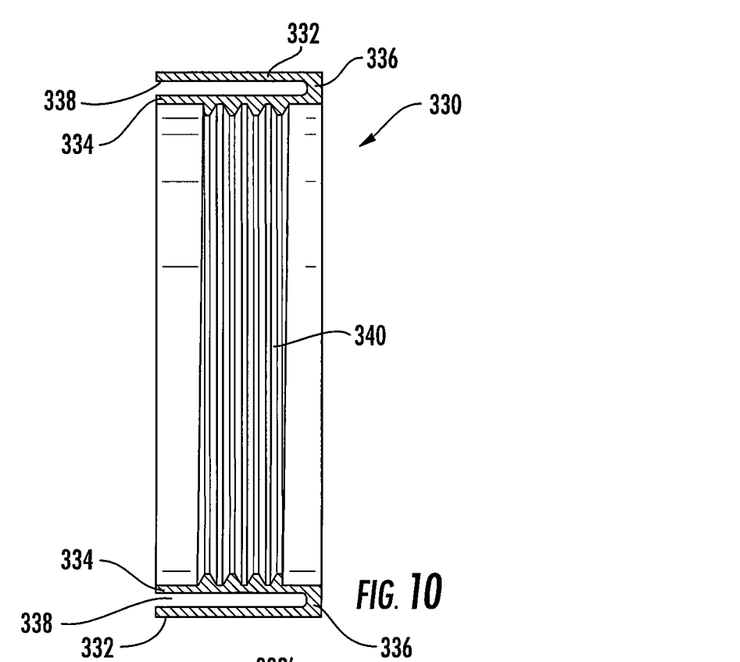
FIG. 10 is a section view of a sealing adapter according to still further alternative embodiments of the invention.

Referring now to FIG. 10, another adapter according to embodiments of the invention, designated broadly at 330, is illustrated therein. The adapter 330 is a single piece component that includes an outer ring 332 and an inner ring 334 connected at one end by a bridge 336, such that a gap 338 is formed between the outer and inner rings 332, 334. Threads 340 extend radially inwardly from the inner surface of the inner ring 334.

The adapter 330 is typically formed of a material that has the softness to form a seal with the threaded stem of the mounting structure to which it is attached, and the rigidity to provide integrity to the joint. However, the material should also be selected to enable the inner ring 334 to flex outwardly (i.e., into the gap 338) so that the adapter 330 with its threads 340 can be removed from an injection mold after molding. Exemplary materials include thermoplastic elastomer (TPE) and ethylene propylene diene monomer (EPDM) rubber.

Figure 11:
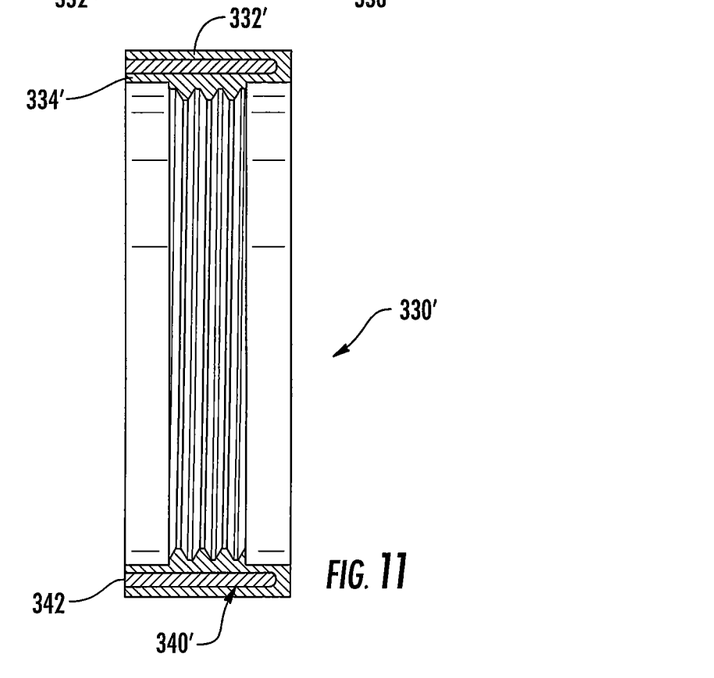
FIG. 11 is a section view of a sealing adapter according to yet further alternative embodiments of the invention.

An alternative adapter 330' is shown in FIG. 11. The adapter 330' is identical to the adapter 330, but includes a soft, pliable material 342 (such as a silicone elastomer or the like) that at least partially fills the gap 340. Filling the gap 340 can prevent water or other environmental agents from pooling in the gap 340 after the adapter 330' is installed in the field.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A sealing adapter for enhancing sealing of a sealing device and a threaded member, comprising:
   a generally annular outer shell formed of a first material, the outer shell having first and second longitudinal ends and an inner surface, the inner surface including at least one thread; and
   a generally annular inner core formed of a second material that differs from the first material, the inner core including a threaded inner surface that combines with the at least one thread of the outer shell to form a threaded arrangement configured to be received on the threaded member;
   wherein the inner core further comprises an outer surface between the first and second longitudinal ends of the outer shell that presents a sealing location for the sealing device;
   wherein the outer shell includes a body that extends between the first and second ends, and
   wherein the inner core includes an inner ring that is radially inward of the body and an outer ring that is radially outward of the body, the outer surface of the inner core being part of the outer ring.

2. A sealing adapter for enhancing sealing of a sealing device and a threaded member, comprising:
   a generally annular outer shell formed of a first material, the outer shell having first and second longitudinal ends and an inner surface, the inner surface including at least one thread; and
   a generally annular inner core formed of a second material that differs from the first material, the inner core including a threaded inner surface that combines with the at least one thread of the outer shell to form a threaded arrangement configured to be received on the threaded member;

wherein the first and second ends of the outer shell include, respectively, upper and lower rims that sandwich the outer surface of the inner core;

the adapter being in combination with the threaded member threaded onto the threaded arrangement of the adapter, an electrical cable having a connector threaded onto the threaded member, and a sealing boot that covers the connector and engages the sealing location of the adapter.

3. The sealing adapter defined in claim 1, wherein the second material is less rigid than the first material.

4. The sealing adapter defined in claim 1, wherein the at least one thread comprises at least one first thread adjacent the first end of the outer shell and at least one second thread adjacent the second end of the outer shell.

5. The sealing adapter defined in claim 4, wherein the at least one first thread comprises first and second quarter threads, and the at least one second thread comprises third and fourth quarter threads.

6. The sealing adapter defined in claim 5, wherein the first and second quarter threads are offset by about 180 degrees, and the third and fourth quarter threads are offset by about 180 degrees, and the first and third quarter threads are offset by about 90 degrees.

7. A sealing adapter for enhancing sealing of a sealing device and a threaded member, comprising:

a generally annular outer shell formed of a first material, the outer shell having first and second longitudinal ends and an inner surface, the inner surface including at least one thread; and a generally annular inner core formed of a second material that differs from the first material, the inner core including a threaded inner surface that combines with the at least one thread of the outer shell to form a threaded arrangement configured to be received on the threaded member;

wherein the inner core further comprises an outer surface between the first and second longitudinal ends of the outer shell that presents a sealing location for the sealing device;

wherein the outer shell includes a body that extends between the first and second ends, wherein the inner core includes an inner ring that is radially inward of the body and an outer ring that is radially outward of the body, the outer surface of the inner core being part of the outer ring; and wherein the outer shell body includes holes, and wherein the inner ring and outer ring of the inner core are connected via segments that extend through the holes.

8. The adapter defined in claim 1, wherein the adapter is formed by injection molding.

9. The adapter defined in claim 1, wherein the outer shell is formed by two separate clamshell pieces.

10. The sealing adapter defined in claim 1, in combination with the threaded member threaded onto the threaded arrangement of the adapter.

11. The combination defined in claim 10, further comprising an electrical cable having a connector threaded onto the threaded member, and a sealing boot that covers the connector and engages the sealing location of the adapter.

* * * * *

UNITED STATES PATENT AND TRADEMARK OFFICE
CERTIFICATE OF CORRECTION

PATENT NO. : 10,404,048 B2
APPLICATION NO. : 14/539335
DATED : September 3, 2019
INVENTOR(S) : Ronald A. Vaccaro It is certified that error appears in the above-identified patent and that said Letters Patent is hereby corrected as shown below:

In the Claims

Column 7, Line 11, Claim 2: Please correct "scaling" to read -- sealing --

Signed and Sealed this
Nineteenth Day of November, 2019

Andrei Iancu
*Director of the United States Patent and Trademark Office*